(12) United States Patent
Sugahara

(10) Patent No.: US 8,056,702 B2
(45) Date of Patent: Nov. 15, 2011

(54) FEEDER

(75) Inventor: Sumio Sugahara, Yokohama (JP)

(73) Assignee: SK Machinery Co., Ltd., Kanagawa (JP)

( * ) Notice: Subject to any disclaimer, the term of this patent is extended or adjusted under 35 U.S.C. 154(b) by 318 days.

(21) Appl. No.: 12/091,186

(22) PCT Filed: Oct. 30, 2006

(86) PCT No.: PCT/JP2006/321628
§ 371 (c)(1),
(2), (4) Date: Apr. 23, 2008

(87) PCT Pub. No.: WO2007/052588
PCT Pub. Date: May 10, 2007

(65) Prior Publication Data
US 2009/0127774 A1    May 21, 2009

(30) Foreign Application Priority Data
Oct. 31, 2005    (JP) .................................. 2005-317768

(51) Int. Cl.
*B65G 47/34* (2006.01)
(52) U.S. Cl. ................................. 198/468.9; 198/750.1
(58) Field of Classification Search ............... 198/750.1; 242/397.2, 397.3, 481.3, 481.4, 484, 388.6, 242/388, 399; 74/37, 89
See application file for complete search history.

(56) References Cited

U.S. PATENT DOCUMENTS

| | | | | |
|---|---|---|---|---|
| 652,893 A | * | 7/1900 | Herdman | 254/276 |
| 1,811,623 A | * | 6/1931 | Ferguson | 254/331 |
| 1,881,267 A | * | 10/1932 | Drexler | 198/788 |
| 2,598,709 A | * | 6/1952 | Morris | 74/89.14 |
| 3,804,370 A | * | 4/1974 | Woodard | 254/331 |
| 4,198,170 A | * | 4/1980 | Decker | 400/323 |
| 4,203,680 A | * | 5/1980 | Mitrovich | 400/335 |
| 4,321,726 A | * | 3/1982 | Rogers et al. | 16/2.1 |
| 4,957,014 A | * | 9/1990 | Burke | 74/89.22 |
| 4,973,893 A | * | 11/1990 | Secretan | 318/280 |
| 5,655,727 A | * | 8/1997 | Hanson et al. | 242/388 |

OTHER PUBLICATIONS

Microfilm of the description and drawings annexed to the request of Japanese Utility Model Application No. 4033/1990 (Laid-Open No. 96457/1991), (Mita Industrial Co., Inc.), Oct. 2, 1991.
English Translation of International Preliminary Report on Patentability dated Sep. 9, 2008 for corresponding PCT/JP2006/321628, filed Oct. 30, 2006.

* cited by examiner

*Primary Examiner* — Gene Crawford
*Assistant Examiner* — William R Harp
(74) *Attorney, Agent, or Firm* — Pearne & Gordon LLP

(57) ABSTRACT

There is equipped with a forward and reverse winder (31), a forwardly winding liner body (51), a reversely winding liner body (61) and a reciprocating body (71). The forwardly winding linear body (51) and the reversely winding linear body (61) are connected to the reciprocating body (71). The amounts of winding and rewinding the forwardly and reversely winding linear bodies (51) (61) by the winding drum (37) of the forward and reverse winder are equal to each other. The winding drum (37) of the forward and reverse winder (51) when the forwardly winding linear body (51) is forwardly wound axially moves corresponding to the winding and rewinding pitches of the linear bodies whereby a high precision based on a quiet stabilization of an operation state, durability and miniaturization of construction and a high precision based on proper winding and rewinding of the linear bodies and durability can be improved.

8 Claims, 6 Drawing Sheets ively moving a reciprocating body, which belongs to a mechanical field.
FEEDER

TECHNICAL FIELD

This invention relates to a feeder for reciprocatively moving a reciprocating body, which belongs to a mechanical field.

BACKGROUND OF TECHNOLOGY

As well-known, feeders have been used in many manufacturing fields or other fields. There have been various type feeders such as a belt-conveyor type feeder, a screw type feeder, a cylinder type feeder, a timing belt type feeder and a robot. Such feeders are also called conveyor systems or reciprocating apparatuses.

The belt-conveyor type feeder among the aforementioned feeders is inexpensive and suitable for long distance conveyance, but has a poor precision of positioning the conveyance things and a feeding velocity later than the other feeders. In addition thereto, the belt conveyor requires a large installation space proportional to the conveyance distance. The screw type feeder has the higher precision of conveyance because of the use of the polish ball screw and enables the conveyance at middle or high velocity. However, the expensive polish ball screw would cause the apparatus to get also expensive. The screw type feeder is not of space-saving type and also has a shorter conveyance distance, which makes the long distance conveyance difficult. The cylinder type feeder also has the difficulty of long distance conveyance and the problem of expensiveness in the same manner as the screw type feeder. Thus, this cannot accomplish the compactness, which is required for the space saving. Particularly, the cylinder type feeder has the practical problem in which it is difficult to arbitrarily change the conveyance stroke. On the other hand, the timing belt type feeder is more inexpensive than the screw type feeder using the polish ball screw, but gets more expensive than the belt conveyor if it employs highly precious parts in order to expect the high precision of positioning. In addition thereto, the timing belt type feeder can set the conveyance distance longer than the screw type feeder or the cylinder type feeder, but cannot maintain the conveyance distance identical to that of the belt conveyor due to the restrictions on manufacture or the looseness of the belt. Thus, the timing belt type feeder has the conveyance distance shorter than the belt conveyor even though the former is less elongated than the latter. On the other hand, the robot is too expensive even though it has the considerably high precision and functions. In addition thereto, the robot is not suitable for continuous and long distance conveyance.

As apparent from the foregoing, the conventional feeders have merits and demerits. There has been not developed an advantageous and useful feeder having only merits collected so as to be able to embody it.

Describing the conventional feeders such as the aforementioned ball screw type feeder and the timing belt type feeder in more details, these feeders have an unavoidable occurrence of fine dust (dust of micro m unit or less) caused by friction between the parts of the drive system. There are the fields in which the fine dust is not regarded as questionable and the fields in which the fine dust should be excluded. The fields requiring an extra-high cleanness among the latter fields are the ones of manufacture of liquid-crystal boards and semiconductors.

In order to avoid the occurrence of the fine dust, there have been employed means to heighten an abrasion resistance of the parts or to use grease for reducing the occurrence of the fine dust. Regarding the apparatus, there have been developed a linear servo-actuator having little fine dust occurrence portion as a non-contact power source having electromagnetism power employed. If these means are totally used, predetermined clean atmosphere can be held in the fields of manufacture requiring the extra-high cleanness. However, the linear servo-actuator is too expensive even though it has means good for avoiding the occurrence of fine dust. Therefore, it has been expected to develop means to be able to maintain the cleanness having the same degree as the linear servo-actuator or higher and also to be able to more highly reduce the cost in comparison with the linear servo-actuator.

The technique for reducing the occurrence of the fine dust for the feeder desirably expects all possible measures by multiple means unless the cost gets extremely higher. Since it can improve the yields of the products and reduce the cost for treating the default goods, it will totally improve the economical efficiency.

The precision working apparatus essentially requires the highly precise conveyance as apparent. Therefore, it is an important problem to meet the highly precise conveyance according to its use.

With respect to the feeders, it is also important to maintain the safety and prevent secondary damages by detecting unexpected accidents, which would possibly occur.

The inventor has proposed the following invention as the feeder, which can resolve the aforementioned problems. As apparent from the patent document No. 4 indicated below, the proposed feeder comprises a forward winder which can rotate forwardly and reversely, a reverse winder which can rotate forwardly and reversely, a forwardly winding liner body to be wound and rewound through the forward winder, a reversely winding liner body to be wound and rewound through the reverse winder and a reciprocating body to forwardly and reversely move by means of guide means when it is subject to a forward force or a reverse force. The proposed feeder is characterized in that the forwardly winding linear body to be held so as to be wound and rewound by the forward winder and the reversely winding linear body to be held so as to be wound and rewound by the reverse winder are connected to the reciprocating body, the forward winder on winding rotation and the reverse winder on rewinding rotation rotate in synchronism and phase with each other in the winding and rewinding directions, respectively, the forward winder on rewinding rotation and the reverse winder on winding rotation rotate in synchronism and phase with each other in the rewinding and winding directions, respectively, the amount of winding the forwardly winding linear body by the forward winder and the amount of rewinding the reversely winding linear body by the reverse winder are equal to each other and the amount of rewinding the forwardly winding linear body by the forward winder and the amount of winding the reversely winding linear body by the reverse winder are equal to each other. In addition thereto, a friction occurrence portion may be covered with a dust cover. According to such a proposed feeder, the requirements of positioning accuracy, long distance conveyance, remote conveyance, controllability, high precision feeding, high speed feeding, inexpensiveness, simplicity of construction, space saving, weight reduction, measure for dusting and safety for accident can be met in accordance with the peculiar constructions, functions and effect of the feeder.

In general, a rotary body rotating about a shaft supported at both ends makes its flexure and vibration smaller as the distance between bearings on which both ends of the shaft are supported is smaller so that the quiet and stable state of rotation (state of operation) can be attained. The rotary body having such a desirable state of operation provides an indefectible normal state of operation of relevant parts associated with the rotary body through linear bodies and so on. Thus, the reduction of the distance between the bearings is important for a plan of precision feeding and high precision feeding. This reduction of the distance is desirable because it can avoid a hugeness of the apparatus and also increase a life of the parts of the apparatus based on quietness and stability of the state of operation thereof.

The proposed feeder comprises the forward and reverse winders as the rotary bodies and therefore cannot accomplish the more precise or high-precise feeding unless the distance between the bearings of the rotary bodies is reduced in view of the aforementioned points. Particularly, in case where a winding drum for the forward winder and a winding drum for the reverse winder are axially shifted at the same time when they rotate in order to wind the linear body in an arranged manner, the resolution of this problem has been made difficult because the distance between the bearings should be larger by the amount of shifting of the winding drums. Thus, the proposed feeder is required to have another technical improvement in view of the prevention of enlargement of the distance.

In the proposed feeder, the linear body to be wound around the forward or reverse winder or rewound from the reverse or forward winder is guided in a predetermined direction. In this case, the linear body is required to be precisely wound around or rewound from the winding drums in an equal pitch. If this is not met, the amount of winding the linear body (the amount of rewinding the linear body) per one revolution of the forward or reverse winder has variation generated, which causes the difficulty of precise feeding. More extremely, the portions of the winding linear body adjacent to each other on the winding drum would be rubbed or superposed one on another. Furthermore, if excessive torsion power is imparted to the linear bodies, it would have earlier fatigue and destruction. The proposed feeder has no technical matters for resolving such a problem.

Patent Document 1: JP2002-340127
Patent Document 2: JP2002-372119
Patent Document 3: JP2003-311562
Patent Document 4: Laying-Open Gazette of JP Application No. 2004-272796

DISCLOSURE OF THE INVENTION

It is an object of the invention to provide a feeder to be able to meet the requirements of positioning accuracy, long distance conveyance, remote conveyance, controllability, high precision feeding, high speed feeding, inexpensiveness, simplicity of construction, space saving, weight reduction, measure for dusting and safety for accident and in addition thereto to be able to improve a high precision based on a quietness and stabilization of an operation state, durability and miniaturization of construction and a high precision based on proper winding and rewinding of linear bodies and durability.

A feeder according to a fundamental form of the invention comprises a forward and reverse winder which can rotate forwardly and reversely, a forwardly and reversely winding liner bodies to be wound and rewound through the forward and reverse winder, and a reciprocating body to forwardly and reversely move by means of guide means when it is subject to a forward force or a reverse force; said forward and reverse winder comprising a support shaft to support an exterior part on a periphery of said support shaft, a movable cylindrical body fitted onto the periphery of said support shaft integrally with said support shaft, a cylindrical winding drum having a female screw thread on an inner circumferential face thereof and coaxially connected to an outer periphery of said movable cylindrical body through a space and a stationary cylindrical feeding screw body having on its outer periphery a male screw thread to be engaged with the female screw thread of the winding drum wherein said winding drum is threadedly engaged onto said stationary cylindrical screw body; said forwardly and reversely winding bodies hold so as to be able to be wound and rewound by said winding drum of the forward and reverse winder; the amount of winding the forwardly winding linear body by the winding drum of the forward and reverse winder and the amount of rewinding the reversely winding linear body by the winding drum of the forward and reverse winder are equal to each other and also the amount of rewinding the forwardly winding linear body by the winding drum of the winding drum of the forward and reverse winder and the amount of winding the reversely winding linear body by the winding drum of the winding drum of the forward and reverse winder are equal to each other; and the winding drum of the forward and reverse winder on its winding rotation adapted to move in an axial direction in accordance with a winding pitch and a rewinding pitch.

A feeder according to another form of the invention comprises a forward and reverse winder which can rotate forwardly and reversely, a forwardly and reversely winding liner bodies to be wound and rewound through the forward and reverse winder, and a reciprocating body to forwardly and reversely move by means of guide means when it is subject to a forward force or a reverse force; the forward and reverse winder comprising a support shaft to support an exterior part on an outer periphery of the support shaft, a movable cylindrical body fitted onto the periphery of the support shaft integrally with the support shaft and one of female and male screw threads on the periphery thereof, a cylindrical winding drum coaxially connected to an outer periphery of the movable cylindrical body through a space and a stationary cylindrical feeding screw body having on its outer periphery a screw thread to be engaged with the female or male screw thread of the movable cylindrical body to thereby threadedly engage the stationary cylindrical screw body onto the movable cylindrical body; the forwardly and reversely winding bodies hold so as to be able to be wound or rewound by the winding drum of the forward and reverse winder connected to the reciprocating body; the amount of winding the forwardly winding linear body by the winding drum of the forward and reverse winder and the amount of rewinding the reversely winding linear body by the winding drum of the forward and reverse winder are equal to each other and also the amount of rewinding the forwardly winding linear body by the winding drum of the forward and reverse winder and the amount of winding the reversely winding linear body by the winding drum of the forward and reverse winder are equal to each other; and the winding drum of the forward and reverse winder on its winding rotation adapted to move in an axial direction in accordance with a winding pitch and a rewinding pitch.

A feeder according to a third form of the invention comprises a forward and reverse winder which can rotate forwardly and reversely, forwardly and reversely winding liner bodies to be wound and rewound through the forward and reverse winder, and a reciprocating body to forwardly and reversely move by means of guide means when it is subject to a forward force or a reverse force; the forward and reverse winder comprising a support shaft to support an exterior part on an outer periphery of the support shaft, a motor provided on the outer periphery of the support shaft and having a cylindrical rotor on the outer periphery of the motor, a stationary feeding screw body mounted on the outer periphery of the support shaft adjacent to the motor and having one of female and male screw threads on its outer periphery and a cylindrical winding drum fitted onto the outer periphery of the support shaft so as to rotate integrally with the support shaft, being able to move in an axial direction and having a screw thread to be threadedly engaged with the screw tread of the stationary feeding screw body to be thereby engaged onto the stationary screw body; the forwardly and reversely winding bodies hold so as to be able to be wound or rewound by the winding drum of the forward and reverse winder connected to the reciprocating body; the amount of winding the forwardly winding linear body by the winding drum of the forward and reverse winder and the amount of rewinding the reversely winding linear body by the winding drum of the forward and reverse winder are equal to each other and also the amount of rewinding the forwardly winding linear body by the winding drum of the winding drum of the forward and reverse winder and the amount of winding the reversely winding linear body by the winding drum of the forward and reverse winder are equal to each other; and the drum of the forward and reverse winder on its winding rotation adapted to move in an axial direction in accordance with a winding pitch and a rewinding pitch.

The feeder according to other subordinate form of the invention is one according to either of the aforementioned forms wherein a friction occurrence portion is covered with a dust cover and the forwardly and/or reversely winding linear bodies extend through the dust cover in a non-contact relation thereto.

The feeder of the invention can accomplish the following effects.

(1) The forward direction and the reverse direction of the reciprocating body can be accurately assured. In addition thereto, the forward and reverse movement of the reciprocating body can be accurately performed because the rewinding or winding of the forwardly winding linear body by the forward and reverse winder and the winding or rewinding of the reversely winding linear body by the forward and reverse winder synchronize with each other. Thus, the high positioning accuracy of the reciprocating body on the forward and reverse movement can be obtained.

(2) The long distance conveyance by the reciprocating body can be simply accomplished only by elongating the both of the forwardly and reversely winding linear bodies and the guide means.

(3) The remote control operation of the reciprocating body can be accomplished by elongating the forwardly and reversely winding linear bodies even when the reciprocating body is set at a place far away from the forward and reverse winder. Thus, the remote conveyance can be simply realized when the reciprocating body is at the remote place.

(4) The distance of forward and reverse movement (amount of feeding or backing) of the reciprocating body is determined on the amount of rotation of the forward and reverse winder. That is, since the feeding and backing distances can be controlled by the amount of rotation of the forward and reverse winder, the good controllability can be obtained.

(5) The reciprocating body can be enough to be small-sized and the main linear bodies can have an extremely light weight. Since this means that the inertia moment when the reciprocating body forwardly or reversely moves is low, the high speed feeding can be obtained.

(6) Since the two main linear bodies for enabling the long distance conveyance and the remote conveyance are simply an elongated body, they are remarkably cheaper than a main member of other conveyor means. Thus, the apparatus can be provided with a lower price.

(7) The reciprocating body reciprocates in a predetermined direction so long as it has guide means. Since what is necessary is just to connect this reciprocating body to the linear bodies of the forward and reward winder, the construction can be simplified.

(8) The two linear bodies which are only long and have no bulk on structure can be associated with the forward and reverse winder and the reciprocating body while using a very small space. Thus, the space saving can be accomplished.

(9) The forwardly winding linear body and the reversely winding linear body themselves have light weight. Thus, an appropriate weight saving can be accomplished.

(10) The forward and reverse winder is of a shortened type because its main components are arranged in a coaxially superposed manner. The forward and reverse winder of such construction provides a quiet and stable rotational state (operation state) because of less flexure and vibration of the support shaft. The operation of each of the parts associated through the linear bodies with the forward and reverse winder has a normal state without any fault. Thus, higher precision and accuracy of the feeding can be accomplished. Particularly, the arrangement of the components of the motor in a manner coaxial with the forward and reverse winder provides such a higher effect thereto.

(11) The shortened type forward and reverse winder can obtain a compactness of the feeder by avoiding the elongation thereof and also provides a longer life of the whole apparatus because of the increased durability in accordance with the quiet and stable operation state.

(12) The winding linear body portions of the forwardly and reversely winding linear bodies and a guiding linear body portion across guide pulleys adjacent to the forward and reverse winder are held in parallel to each other. Since the forwardly and reversely winding linear bodies held in a parallel relation to each other are precisely wound on and rewound from the periphery of the winding drum of the forward and reverse winder in an equal pitch, the amount of winding the linear body (the amount of rewinding the linear body) has no variation and therefore the high precision and accuracy of the feeding can be accomplished.

(13) The forwardly and reversely winding linear bodies held in the aforementioned parallel relation thereto never cause the linear body portions to be rubbed or superposed one on another and also a forcible torsion force to be acted against the linear body portions. Thus, the life of the linear bodies can be heightened by avoiding early fatigue destruction. The prevention of the linear body portions from being rubbed contributes also to dust prevention.

(14) Since the feeder has a main action of winding and rewinding the linear bodies by the forward and reverse winder, it provides no dust due to friction and therefore it can be suitably used in such a field as the extra-high cleanness is required.

(15) Since the places where friction occurs and therefore dust is generated are covered with the dust covers, the generated dust is never scattered around the neighborhood. Thus, the cleanness can be furthermore improved. As the forwardly and reversely winding linear bodies pass through the dust cover in a non-contact manner, the linear bodies can be more easily associated with the winder and there can be avoided the poor economy caused by the fact that the places where dust is generated don't require the covers more than necessary.

BEST MODE OF EMBODIMENT OF INVENTION

Figure 1:
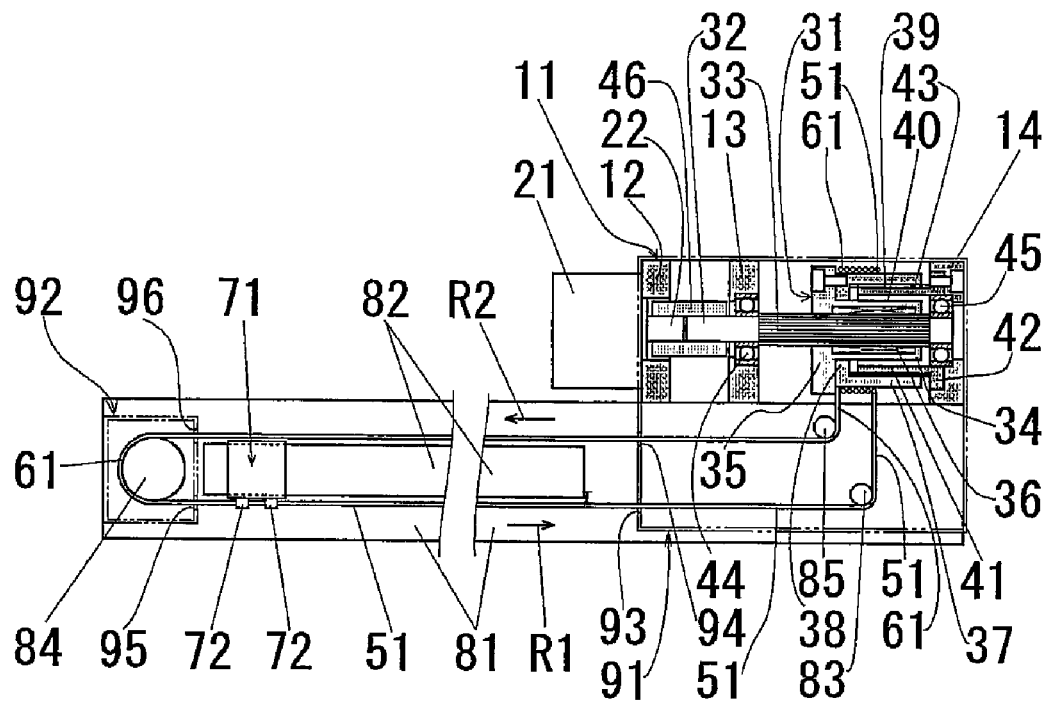
FIG. 1 is a plane view of a feeder constructed in accordance with a first form of embodiment of the invention and illustrated briefly in the state where main portions thereof are broken away.
Figure 2:
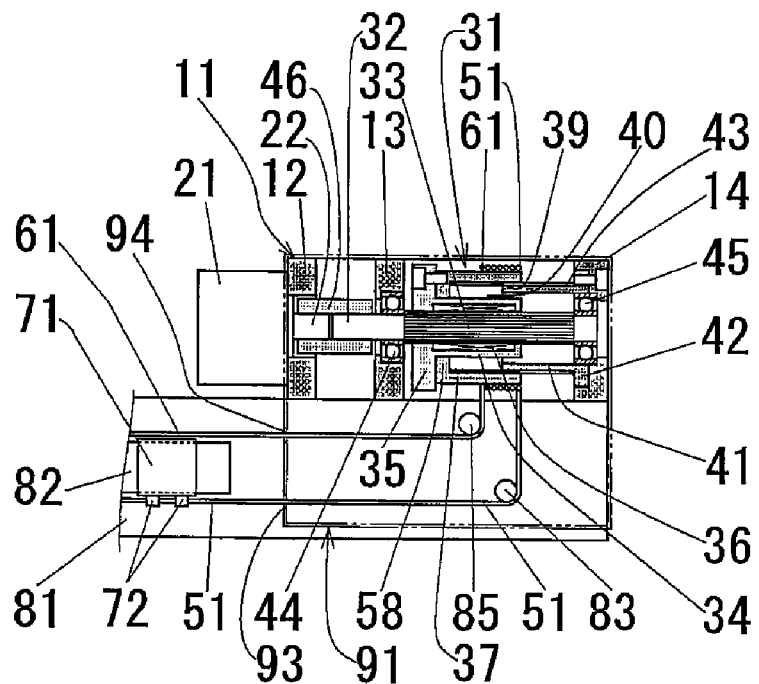
FIG. 2 is a plane view of the feeder according to the first form of embodiment of the invention where the movement state thereof is briefly shown.
Figure 3:
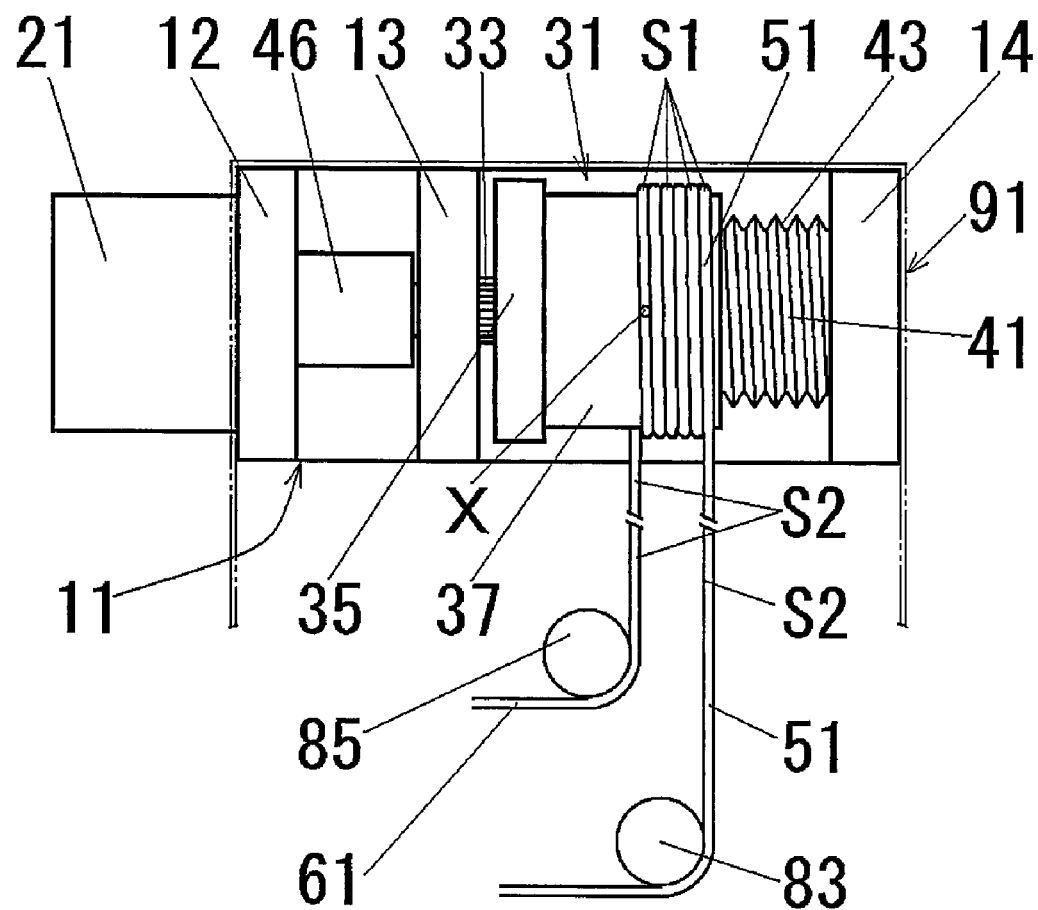
FIG. 3 is a plane view of a forward and reverse winder used for the first of embodiment of the invention.

Some forms of embodiment of the invention will be described with reference to the attached drawings. In FIGS. 1 through 3, there is shown a feeder according to a first form of embodiment of the invention, which comprises a mount stand 11, a motor 21 and a forward and reverse winder 31. The forward and reverse winder 31 serves to wind or rewind a forwardly winding linear body 51 and a reversely winding linear body 61. In these figures, a reference numeral 71 designates a reciprocating body, a reference numeral 81 designates a base, a reference numeral 82 designates guide means and reference numerals 83 through 85 designate pulleys.

The mount stand 11 may be formed of materials of excellent mechanical properties such as metal, synthetic resin, composite materials, etc. and has a plural of support walls 12 through 14 rising from its upper face.

The motor 21 may comprise a publicly known or well-known servo-motor or pulse motor. The motor 21 has an output shaft 22 rotating integrally with a motor rotor.

The forward and reverse winder 31 has a function of winding and rewinding the forwardly winding linear body 51 and the reversely winding linear body 61. The forward and reverse winder 31 may be formed of materials of excellent mechanical properties such as metal, synthetic resin, composite materials, etc. Main parts of the forward and reverse winder 31 include a support shaft 32, a movable cylindrical body 34, a winding drum 37, a stationary feeding screw body 41 and so on. The support shaft 32 has an outer periphery having a guide face or exterior part 33 to guide the movable cylindrical body 34 in an axial direction without any slippery rotation of the movable cylindrical body 34. For a concrete example of the support shaft 32, the guide face 33 of the support shaft 32 may have an outer periphery of well-known spline such as angular spline, ellipse spline, polygonal spline and an involute spline. The movable cylindrical body 34 has a flange 35 extending in a diametrical direction at one end thereof. The inner circumferential face of the movable cylindrical body 34 has a guide face 36 corresponding to the guide face 33 of the support shaft 32. More particularly, the guide face 36 may comprise an inner circumferential face of well-known spline corresponding to the aforementioned one. More particularly, the movable cylindrical body 34 may comprise an inner cylindrical member having the guide face 36 and fitted into an outer cylindrical member of the movable cylindrical body so that they are secured to each other. The winding drum 37 may be in a cylindrical form and has a ring-like flange 38 provided at one end thereof. The winding drum 37 may have a female screw thread 39 formed on the inner circumferential face thereof. The movable cylindrical body 34 and the winding drum 37 are combined so as to form a double-cylindrical construction by uniting them in a coaxial manner with each other with the movable cylindrical body 34 disposed inside and with the winding drum 37 disposed outside. More particularly, as shown in the figures, they are united with each other so that the flanges 35 and 38 contact with each other in a face-to-face manner and secured by well-known fixtures such as bolts and so on. In this case, a space 40 is interposed between the inner circumferential face of the winding drum 37 and the outer periphery of the movable cylindrical body 34. The stationary feeding screw body 41 has on its outer periphery a male screw thread to be threadedly engaged with the female screw thread 39. With respect to the united movable cylindrical body 34 and drum 37, the support shaft 32 extends through the movable cylindrical body 34 whereby the support shaft 32 and the movable cylindrical body 34 are spline-combined on the guide faces 33 and 36. With respect to the winding drum 37 and the stationary feeding screw body 41, they are screw-combined by threadedly engaging them with each other in a relative manner. In this case, the spline may be desirably of ball spline which has many balls (small balls) retained by a retainer and disposed between the inner and outer circumferential faces of the spline. In this manner, the forward and reverse winder 31 is assembled.

The thus assembled forward and reverse winder 31 is so disposed as to be provided between the support walls 13 and 14 of the mount stand 11 as shown in FIGS. 1 through 3. More concretely, the support shaft 32 at both ends thereof is rotatably supported through bearings 44 and 45 on the support walls 13 and 14 and the stationary screw body 41 is secured to the support wall 14 by threadedly engaging the flange 42 into the support wall 14. One end of the support shaft 32 extends through the support wall 13 so as to protrude out of the support wall 13 toward the support wall 12.

Referring to FIGS. 1 through 3, the motor 21 is mounted on the outer wall face of the support wall 12 of the mount stand 11 and the output shaft 22 thereof extends through the support wall 12 and protrudes out of the support wall 12 toward the support wall 13. The support shaft 32 and the output shaft 22 thus arranged in alignment with each other are connected to each other by a conventional coupling 46 provided between the faced ends of the support shaft 32 and the output shaft 22. Thus, the motor 21 and the forward and reverse winder 31 are connected to each other. The mount stand 11 on which the motor 21 and the forward and reverse winder 31 are mounted is installed on the base 81 on the side of the root end thereof as shown in FIG. 1.

Both of the forwardly and reversely winding linear bodies 51 and 61 may comprise a tough elongated body. Those linear bodies may be formed of materials of arbitrary diameter such as finely thin body like a thread or thick body like a rope. From the point of practical view, the linear bodies 51 and 61 of small diameter are desirable so long as the strength can be maintained. The linear bodies 51 and 61 have flexibility, but no substantial elasticity due to its tensile strength. The concrete materials of the linear bodies 51 and 61 may be metal, synthetic resin and composite materials of them. They may be formed of a plural of single yarns or wires twisted. An effective example of the linear bodies 51 and 61 may be formed of aramid fibers commercially available as Kevlar (the trade name). The linear bodies 51 and 61 illustrated in FIG. 1 are connected into a single body and have an endless form.

In FIGS. 1 through 3, the forwardly winding linear body 51 and the reversely winding linear body 61 are wound on the winding drum 37 of the forward and reverse winder 31 and are connected to the reciprocating body 71 described later through the pulleys. When they are to be wound on the winding drum 37, the series-connected linear bodies 51 and 61 are spirally wound on the winding drum 37. More particularly, the linear bodies 51 and 61 are wound so that the winding amount of the forwardly winding linear body 51 onto the winding drum 37 and the winding amount of the reversely winding linear body 61 onto the winding drum 37 are equal to each other. In this case, for one example, the boundary portion of the linear bodies 51 and 61 becomes a fixture portion X of the linear bodies 51 and 61 onto the winding drum 37 and the fixture portion X is fixed to the boundary portion of the winding drum 37 as shown in FIG. 3. This fixture means may be arbitrary unless the fixture portions X moves, but the concrete examples thereof are as follows. For one example, a ring-like hole may be provided in the boundary portion of the winding drum 37 and the fixture portion X passes through the hole and bound onto the boundary portion. For another example, a recess may be provided in the boundary portion of the winding drum 37 and the fixture portion X is engaged in the recess and thereafter secured to the boundary portion by forcibly inserting a fixture device (a stopping plug) on the fixture portion. For further example, with a through-hole provided in the boundary portion of the cylindrical winding drum 37, the fixture portion X is inserted through the through-hole into the boundary portion of the winding drum 37 and secured to the boundary portion by applying the securing or escape preventing device onto the boundary portion. For further example, a tightening or inserting clamp may be provided on the boundary portion of the winding drum 37 and the fixture portion X may be secured to the boundary portion by the clamp. For example other than the aforementioned means, the fixture portion X may be secured to the boundary portion of the winding drum 37 by adhesion means (including welding means in case that the linear bodies are of metal). The fixture portion X may be secured by combination of adhesion means and other means.

The reciprocating body 71 itself shown in FIG. 1 may be a working machinery instrument, a conveying device or a portion of a working robot. The reciprocating body 71 of FIG. 1 may be provided with traveling members such as bearings (not shown) for moving the reciprocating body 71 and also with a grasping member 72 for clamping the linear bodies, which are tightly held by the grasping member to be secured to the reciprocating body.

The reciprocating body 71 of FIG. 1 is installed on a predetermined working area for performing the predetermined operation. On the working area may be provided the base 81 as a feeding stand on which the guide means 82 in the form of guide rails, for example may be provided for moving the reciprocating body. The reciprocating body 71 is installed on the guide means 82 on the base 81 and can reciprocate along the longitudinal direction of the guide means 82. The forwardly and reversely winding linear bodies 51 and 61 are connected to the reciprocating body 71. Rotational wheels such as pulleys or sheaves may be disposed for maintaining the connection. In the illustrated form, the pulleys 83 and 85 for controlling and converting the traveling direction of the linear bodies may be provided on the root end of the base 81 and the idling pulley 84 may be provided on the leading end of the base 81.

In the form of FIGS. 1 through 3, the forwardly and reversely winding linear bodies 51 and 61 are associated with the reciprocating body 71 as follows. With respect to the forwardly winding linear body 51, the portion of the forwardly winding linear body 51 rewound from the winding drum 37 of the forward and reverse winder 21 reaches a fixture member 72 of the reciprocating body 71 on the guide means 82 on the base 81 through the pulley 83. Similarly, with respect to the reversely winding linear body 51, the portion of the reversely winding linear body 61 rewound from the winding drum 37 of the forward and reverse winder 21 reaches the pulley 84 through the middle pulley 85 and reaches the fixture member 72 of the reciprocating body 71 after it is u-turned. The fixture portions of the linear bodies 51 and 61 reaching the fixture member 72 are connected to each other in series. Thus, the linear bodies 51 and 61 and the reciprocating body 71 are associated with each other by inserting the fixture portions into and being tightened by the fixture member 72.

In the form of embodiment of FIGS. 1 through 3, there may be provided dust covers 91 and 92 which surround friction occurrence portions (dust occurrence portions) due to friction of various parts between the adjacent ones such as the support shaft 32 and the movable cylindrical body 34, the winding drum 37 and the stationary feeding screw body 41, the winding drum 37 and the linear bodies 51 and 61, the linear bodies 51 and 61 and the pulleys 83 and 85 and the linear bodies 51 and 61 and the pulley 84 and so on. The dust covers 91 and 92 may have through-holes 93 through 96 of small diameter formed for allowing the linear bodies 51 and 61 to pass through the dust covers 91 and 92. These dust covers 91 and 92 serve to prevent the dust generated in the friction occurrence portions from being scattered outside whereby the work atmosphere and the articles to be conveyed are not contaminated.

In the feeder of the invention illustrated in FIG. 1, when the output shaft 22 of the motor 11 rotates in a clockwise direction, the support shaft 32 connected to the output shaft 22 rotates in the same direction and therefore the forward and reverse winder 31 also rotate in a clockwise direction. More particularly, the rotation of the motor 11 is transferred to the support shaft 22 and the rotation of the support shaft 22 is transferred through the guide faces 33 and 36 to the movable cylindrical body 34, which causes the winding drum 37 integral with the movable cylindrical body 34 to rotate in the clockwise direction. Since the winding drum 37 is threadedly engaged with the stationary feeding screw body 41 through the female screw thread 39 and the male screw thread 43, the winding drum 37 also moves in the axial direction (the leftward direction of FIG. 1) by being subject to the feeding by the female screw thread 39 and the male screw thread 43. This is why the spline guide faces 33 and 36 allow the axial movement of the movable cylindrical body 34, which is apparent from the foregoing. Thus, when the winding drum 37 moves in a leftward direction as viewed from FIG. 1 in a predetermined pitch while it is rotating in the clockwise direction, the forwardly winding linear body 51 is wound on the outer periphery of the winding drum 37 and at the same time the reversely winding linear body 61 is rewound from the outer periphery of the winding drum 37. As apparent from the foregoing, the amount of winding the forwardly winding linear body 51 and the amount of rewinding the reversely winding linear body 61 are equal to each other. Accordingly, the forwardly winding linear body 51 is pulled in a direction indicated by an arrow R1 as viewed in FIG. 1 and at the same time the reversely winding linear body 61 is pulled out in a direction indicated by an arrow R2 as viewed in FIG. 1. Thus, the reciprocating body 71, which is mounted on the guide means 82 on the base 81 moves in the direction indicated by the arrow R1 by being subject to the feeding action due to the winding and rewinding of the linear bodies. When the winding drum 37 of the forward and reverse winder 31 is displaced to the most leftward side and the reciprocating body 71 is displaced to the most rightward side, which is made by the aforementioned feeding action, the feeder gets the state shown in FIG. 2. Reversely, when the output shaft 22 of the motor 21 rotates in a counterclockwise direction, the action reverse to the foregoing action occurs. More particularly, at the same time when the forwardly winding linear body 51 is rewound out of the winding drum 37 of the forward and reverse winder 31, the reversely winding linear body 61 is wound on the forward and reverse winder 31. At that time, the amount of rewinding the forwardly winding linear body 51 and the amount of winding the reversely winding linear body 61 are also equal to each other. Therefore, the reciprocating body 71 is fed in the direction reverse to that indicated by the arrow R1 and it moves in the leftward direction as viewed in FIGS. 1 and 2 while it is subject to the guiding action of the guide means 82.

When the reciprocating body 71 is fed as shown in FIGS. 1 through 3, the winding drum 37 of the forward and reverse winder 31 is controlled by the lead of the female screw thread 39 and the male screw thread 43. Therefore, the winding drum 37 is shifted in the axial direction in a pitch corresponding to the winding and rewinding pitches of the linear bodies 51 and 61. It will be allowed to be considered that the respective pitches of the linear bodies 51 and 61 are equal to the diameter of the linear bodies when they are spirally wound on the winding drum 37 in a tight manner. If they are spirally wound on the winding drum 37 in a rough manner so that the adjacent coils of them are spaced, the addition of the space distance to the diameter of the linear bodies gets equal to the winding and rewinding pitches of them. When the linear bodies 51 and 61 are wound and rewound by the rotation of the forward and reverse winder 31, the pulleys 83 and 85 disposed adjacent to the winding drum 37 provide a good result to the linear bodies. This is because the winding portions S1 of the linear bodies 51 and 61 wound on the winding drum 37 and the guiding portions S2 across the pulleys 83 and 85 are held in parallel to each other and paradoxically because the pulleys 83 and 85 are so disposed that the portions S1 and S2 are held in parallel to each other. This causes the linear bodies 51 and 61 to be precisely wound on and rewound out of the outer periphery of the winding drum 37 in the equal pitch and the precise feeding can be accomplished by no variation in the mount of winding the linear bodies (the amount of rewinding them) per one revolution of the forward and reverse winder 31. The maintenance of the parallel state of the linear bodies 51 and 61 prevents the adjacent linear body portions on the periphery of the winding drum 37 of the forward and reverse winder 31 from being rubbed against each other and superposed one on another and also from application of excessive torsion force to them and therefore the earlier fatigue destruction of the linear bodies 51 and 61 can be avoided whereby their life can be elongated. Especially, the prevention of the winding linear body portions from being rubbed against each other contributes to the prevention of dust occurrence.

In the form of embodiment of FIGS. 1 through 3, the forwardly and reversely winding linear bodies 51 and 61 are just named based on the relative relationship between them. Therefore, the forwardly and reversely winding linear bodies 61 and 51 may be renamed without any substantial change. In the form of embodiment of FIGS. 1 through 3, although the linear bodies 51 and 61 are indicated in an excessively large manner and the reciprocating body 71 is indicated in an excessively small manner for convenience of explanation, it will be understood that they can operate without any inconsistency. In the form of embodiment of FIGS. 1 through 3, when the reciprocating body 71 should be fed in the forward and rearward direction or in the leftward and rightward direction, the guide means 82 should be disposed in a horizontal manner as shown in these figures, but when the reciprocating body 71 should be fed in the vertical direction, the guide means 82 should be held in a vertical manner and when the reciprocating body 71 should be fed in the inclination direction, the guide means 82 should be held in an inclined manner. In FIGS. 1 through 3, since the forwardly and reversely winding linear bodies 51 and 61 are in series, when these linear bodies are to be connected to the reciprocating body 71, the boundary portions of the linear bodies 51 and 61 are not required to be secured to the fixture member 73. More particularly, even in the case where the forwardly winding linear body 51 is secured by the fixture member 73 or the reversely winding linear body 61 is secured by the fixture member 73, the opposite linear body will be indirectly connected to the reciprocating body 71. The forward and reverse winder 31 desirably has spiral grooves of recessed type (of circular cross section or of V-shaped cross section, for example) formed in the winding drum 37 thereof. In this case, the linear bodies can be stably wound on and rewound out of the winding drum 37 in an orderly manner. If the linear bodies 51 and 61 are possibly removed from the pulleys 83 through 85 or if they are possibly slackened, a removal stopper (a stopper roller, for example) or a tension applier (a tension roller, for example) may be applied to the linear bodies 51 and 61. Otherwise, the pulley 84 may be of tension pulley. There may be disposed other pulleys than the pulleys 83 and 85 for pulling backwardly and forwardly in an arbitrary position including upper and lower positions, leftward and rightward positions, forward and backward positions and so on, which are relative to the forward and reverse winder 31 in the relation to the reciprocating body 71. In this case, one or both of the linear bodies 51 and 61 may pass through one or more of the support walls 12 and 13.

Figure 4:
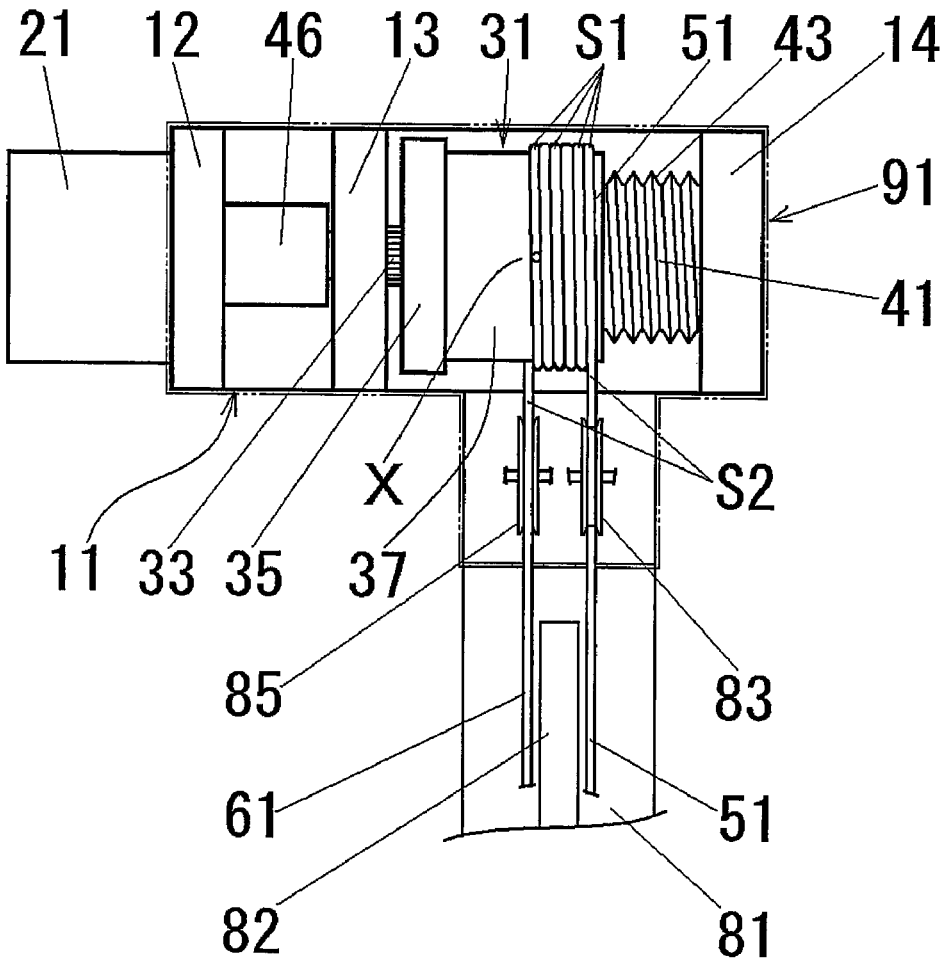
FIG. 4 is a plane view of a feeder constructed in accordance with a second form of embodiment of the invention where main portions are briefly shown.

Another form of embodiment of the feeder of the invention is illustrated in FIG. 4. In this form of embodiment, the support shaft 32 of the forward and reverse winder 31 is disposed so as to be orthtropical to the movement direction of the reciprocating body 71 (the longitudinal direction of the guide means 82) and the forward and reverse winder 31 is disposed on the root end of the base 81 so as to maintain such a relative position of the forward and reverse winder 31. The other technical matters of the feeder according to this form of embodiment are substantially identical or similar to those of the aforementioned form of embodiment. Therefore, the explanation of them will be omitted by reference to them.

In the feeder shown in FIG. 4, the reciprocating body 71 reciprocatively moves by winding and rewinding the forwardly winding linear body 51 and the reversely winding linear body 61. Since the forwardly winding linear body 51 and the reversely winding linear body 61 are never largely bent at the position where the pulleys 83 and 85 are placed, the linear bodies 51 and 61 can be relieved from application of concentrated load and the parallel relation between the winding linear body portions S1 and the guide linear body portions S2 can be maintained.

Figure 5:
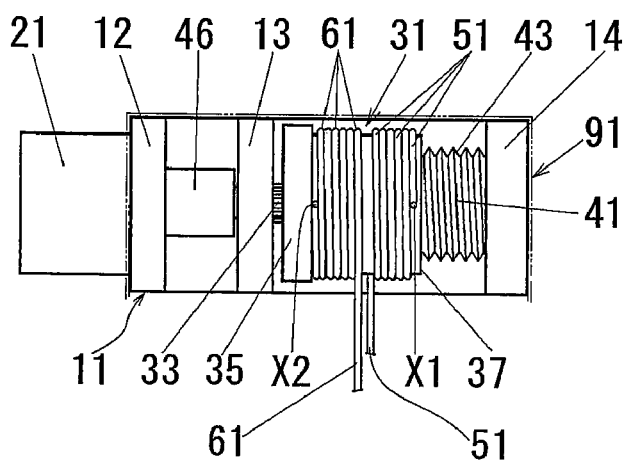
FIG. 5 is a plane view of a forward and reverse winder used for a third form of embodiment of the invention.

Further form of embodiment of the feeder of the invention is illustrated in FIG. 5. In this form of embodiment, the ends of the forwardly winding linear body 51 and the reversely winding linear body 61 secured to the winding drum 37 are separated as indicated by X1 and X2. As apparent from FIG. 5, the fixture end X1 of the forwardly winding linear body 51 is secured to the outer periphery of one end of the winding drum 37 in the same manner as aforementioned while the fixture end X2 of the reversely winding linear body 61 is secured to the outer periphery of other end of the winding drum 37 in the same manner as aforementioned. In the form of FIG. 5, since the forwardly winding linear body 51 has the fixture end X1 at the rightward end and the winding and rewinding end at the leftward end and the reversely winding linear body 61 has the fixture end X2 at the leftward end and the winding and rewinding end at the rightward end, the linear bodies 51 and 61 are wound and rewound by rotation of the winding drum 37 in an opposite direction to each other. The portions of the linear bodies 51 and 61 secured to the reciprocating body 71 may be continued or separated. In either of the state of fixture of the linear bodies 51 and 61, the portions of them are secured to the reciprocating body 71 in the condition where they are turned around the pulley 84 as shown in FIG. 1. The other technical matters of the feeder according to the form of embodiment of FIG. 5 are substantially identical or similar to those of the aforementioned forms of embodiment. Therefore, the explanation of them will be omitted by reference to them.

In the feeder shown in FIG. 5, the reciprocating body 71 reciprocatively moves by winding and rewinding the forwardly winding linear body 51 and the reversely winding linear body 61 in the same manner as described with reference to the aforementioned forms of embodiment. Although, in the forms of embodiment of FIGS. 1 through 4, there are a lot of idling portions of the outer periphery of the winding drum 37 where the linear bodies are not wound, there are less idling portions where the linear bodies are not wound in the form of FIG. 5. Thus, in this form of embodiment, the outer periphery of the winding drum 37 can be desirably used in a fully effective manner. Such an effective use of the outer periphery of the winding drum 37 can shorten the axial length of the forward and reverse winder 31 while the necessary amount of winding the linear bodies is maintained.

Figure 6:
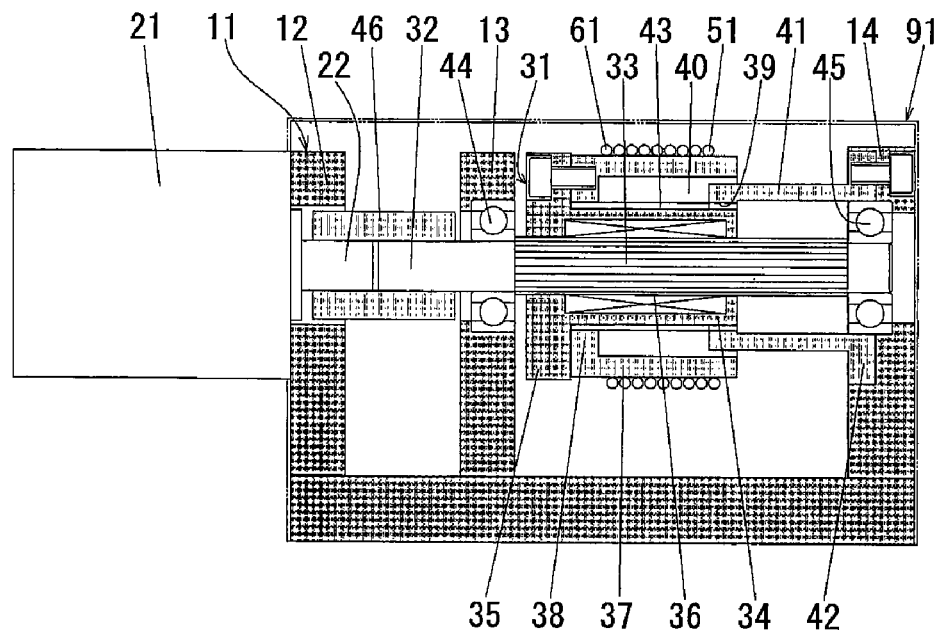
FIG. 6 is a longitudinal cross sectional view of a forward and reverse winder used for a fourth form of embodiment of the invention.

Further form of embodiment of the feeder of the invention is illustrated in FIG. 6. In this form of embodiment, the positions where the female screw thread 39 and the male screw thread 43 are formed are different from the aforementioned forms of embodiment. More particularly, the female screw thread 39 is formed on the inner circumferential face of the stationary feeding screw body 41 while the male screw thread 43 is formed on the movable cylindrical body 34. Thus, the movable cylindrical body 34 has the spline guide face 36 on the inner circumferential face thereof and the male screw thread 43 on the outer periphery thereof and the winding drum 37 has no screw thread. The movable cylindrical body 34 and the stationary feeding screw body 41 are combined with each other through the female screw thread 39 and the male screw thread 43 engaged with each other. The other technical matters of the feeder according to the form of embodiment of FIG. 6 are substantially identical or similar to those of the aforementioned forms of embodiment. Therefore, the explanation of them will be omitted by reference to them.

In the feeder shown in FIG. 6, the reciprocating body 71 reciprocatively moves by winding and rewinding the forwardly winding linear body 51 and the reversely winding linear body 61 in the same manner as described with reference to the aforementioned forms of embodiment. In his form of embodiment, since just the positions where the female screw thread 39 and the male screw thread 43 are formed are different from the aforementioned forms of embodiment, its function and effect are identical to those of form of embodiment of FIGS. 1 through 3.

The design of the form of embodiment of FIG. 6 may be changed. For one example, the movable cylindrical body 34 may be longitudinally divided into two sections where the spline guide face 36 and the female screw thread 39 are formed, respectively. More particularly, In FIG. 6, the movable cylindrical body 34 has the spline guide face 36 formed on the leftward inner circumferential face thereof and the female screw thread 39 formed on the rightward inner circumferential face thereof. Although, in this form of embodiment, the spline engagement is identical to that aforementioned forms, the movable cylindrical body 34 and the stationary feeding screw body 41 are combined with the female screw thread 39 formed on the movable cylindrical body 34 and the male screw thread 43 formed on the outer periphery of the stationary feeding screw body 41 engaged with each other. For another example, the movable cylindrical body 34 has a double cylindrical structure (threefold cylindrical structure including the winding drum 37). The movable cylindrical body 34 of such a double cylindrical structure may have the spline guide face 36 formed on the inner circumferential face of its inner cylinder and the female screw thread 39 formed on the inner circumferential face of its outer cylinder or the male screw thread 43 formed on the outer periphery of its outer cylinder. The stationary feeding screw body 41 may have either of the female screw thread 39 and the male screw thread 43 formed on either of the inner and outer circumferential faces thereof corresponding to the screw thread of the movable cylindrical body 34. In this form of embodiment, the spline engagement is carried out by the guide face 33 of the support shaft 32 and the spline guide face 36 of the inner cylinder (the movable cylindrical body 34) while the combination of the movable cylindrical body 34 and the stationary feeding screw body 41 is carried out by the screw thread (either of the female screw thread 39 and the male screw thread 43) of the outer cylinder (the movable cylindrical body 34) and the screw thread (another of the female screw thread 39 and the male screw thread 43) of the stationary feeding screw body 41 threadedly engaged with each other.

Figure 7:
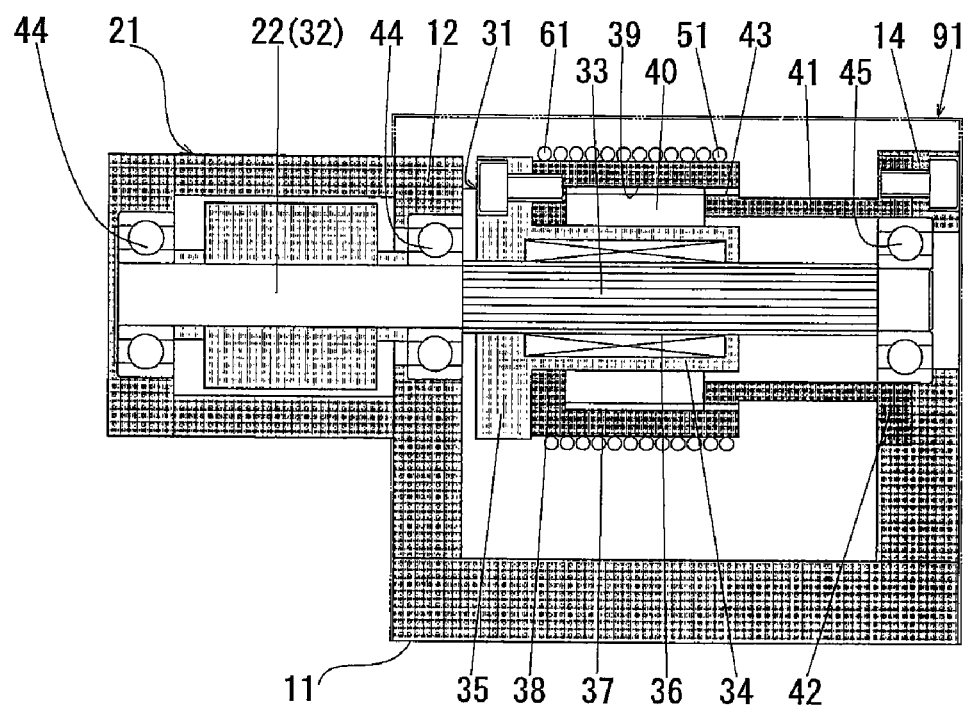
FIG. 7 is a longitudinal cross sectional view of a forward and reverse winder used for a fifth form of embodiment of the invention.

Further form of embodiment of the feeder of the invention is illustrated in FIG. 7. In this form of embodiment, the output shaft 22 of the motor 21 also serves as the support shaft 2 of the aforementioned forms of embodiment. More particularly, the output shaft 22 of this form of embodiment has the leading portion serving as the support shaft 32 of the forward and reverse winder 31 and the spline guide face 33 is formed on the outer periphery of the support shaft 32. The mount stand 11 has two support walls 12 and 14, but no support wall 13. In this form of embodiment, the motor 21 and the forward and reverse winder 31 are originally of integral structure without any coupling. Thus, the motor 21 and the forward and reverse winder 31 are installed on the mount stand 11 by the output shaft 22 (the support shaft 32) being supported between the support walls 12 and 14. The other technical matters of the feeder according to the form of embodiment of FIG. 7 are substantially identical or similar to those of the aforementioned forms of embodiment. Therefore, the explanation of them will be omitted by reference to them.

In the feeder shown in FIG. 7, the reciprocating body 71 reciprocatively moves by winding and rewinding the forwardly winding linear body 51 and the reversely winding linear body 61. In his form of embodiment, since the motor 21 and the forward and reverse winder 31 are integral with each other and the axial length thereof is shortened, the main components of the feeder can be advantageously compacted.

Figure 8:
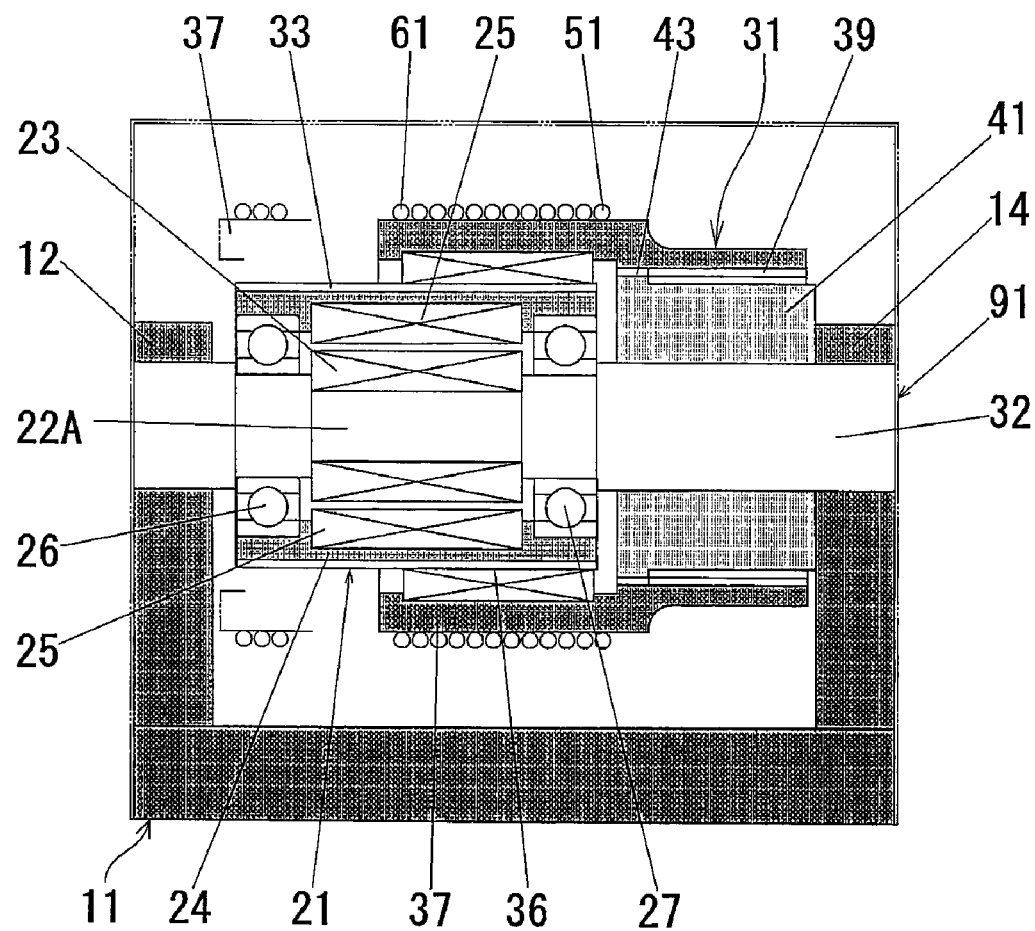
FIG. 8 is a longitudinal cross sectional view of main portions of a forward and reverse winder used for a sixth form of embodiment of the invention.

Further form of embodiment of the feeder of the invention is illustrated in FIG. 8. In this form of embodiment, the motor 21 and the forward and reverse winder 31 are integral with each other so that they are superposed one on another in a diametrical direction. In the form of embodiment of FIG. 8, the motor shaft 22A of the motor 21 and the support shaft 32 of the forward and reverse winder 31 are integral with each other and the support shaft 32 also serves as the motor shaft 22A as the support shaft 32 is considered as a standard. The support shaftv32 having the motor shaft 22A is secured to the mount stand 11 so that it is supported between the support walls 12 and 14 thereof in FIG. 8. There are attached the parts of the motor 21 and the parts of the forward and reverse winder 31 onto the outer periphery of the support shaft 32 having the motor shaft 22A attached thereto.

As shown in FIG. 8, the winding drum 37 of the forward and reverse winder 31 and the stationary feeding screw body 41 are attached onto the outer periphery of the support shaft 32. With the inner circumferential face of the winding drum 37 divided into left and right sections, the inner circumferential face of one of the sections has the spline guide face (the spline inner circumferential face) 36 in the same manner as aforementioned while that of another section has the female screw thread 39. The stationary feeding screw body 41 has the female screw thread 43 formed on its outer periphery. The stationary feeding screw body 41 is fitted onto and secured to the support shaft 32 and the winding drum 37 is rotatably provided on the outer periphery of the stationary feeding screw body 41 by the female and male screw threaded 39 and 43 engaged with each other.

As shown in FIG. 8, what are attached onto the outer periphery of the motor shaft 22A are a cylindrical motor stator 33, a cylindrical motor rotor 24, a motor magnetic field 25, a pair of bearings 26 and 27 and other motor parts (not shown). The stator 23 is fitted onto the outer periphery of the middle portion of the motor shaft 22A and the pair of bearings 26 and 27 are provided on the outer periphery of both ends of the motor shaft 22A. The cylindrical rotor 24 has the magnetic field attached onto the inner circumferential face thereof. The cylindrical rotor 24 also has the aforementioned spline guide face (spline outer periphery face) 33. The cylindrical rotor 24 is provided between the bearings 26 and 27 on the outer periphery of the motor shaft 22A so as to rotatably support them.

The other technical matters of the form of embodiment of FIG. 8 are substantially identical or similar to those of the aforementioned forms of embodiment. Therefore, the explanation of them will be omitted by reference to them.

In the feeder shown in FIG. 8, the reciprocating body 71 reciprocatively moves by winding and rewinding the forwardly winding linear body 51 and the reversely winding linear body 61. When the motor 21 gets the state of being turned on (the state of electrical conduction), the cylindrical rotor 24 having the magnetic field rotates forwardly or reversely relative to the stator 23 fixed onto the motor shaft 22A. As the cylindrical rotor 24 rotates in this manner, the winding drum 37 spline-engaged with the rotor 24 through the guide faces 33 and 36 rotates in the same direction. The winding drum 37 is threadedly engaged with the stationary feeding screw body 41 through the female and male screw threaded 39 and 43 and therefore is fed by the rotation of the cylindrical rotor 24 having the male screw thread 43 relative to the stationary feeding screw body 41 having the female screw thread 39, which causes the winding drum 37 to move in the axial direction in the state of spline engagement. In other words, the winding drum 37 moves in the axial direction while it rotates and winds and rewinds the linear bodies 51 and 61 in the same manner as aforementioned whereby the reciprocating body 71 reciprocatively moves. In this form of embodiment, since the motor 21 and the forward and reverse winder 31 are integrally combined so that they are superposed one on another in the diametrical direction, the axial length of the feeder can be considerably reduced and therefore the compactness of the main parts of the apparatus can be considerable.

Figure 9:
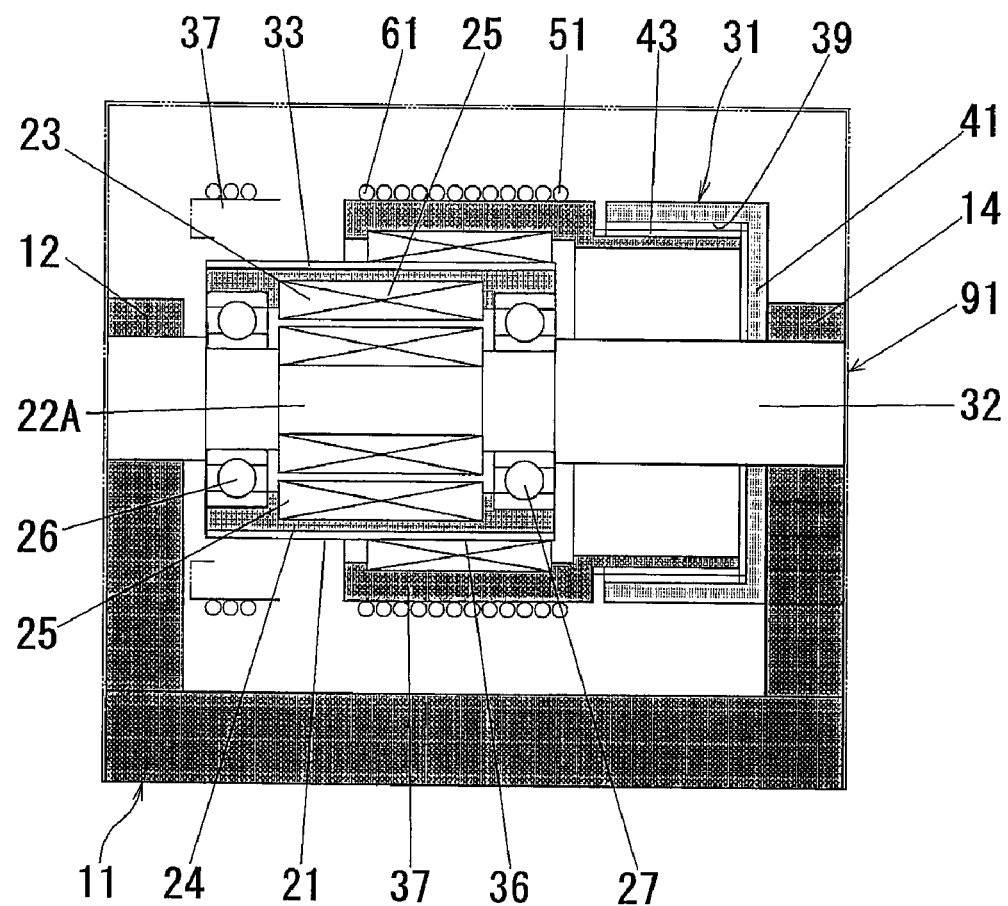
FIG. 9 is a longitudinal cross sectional view of main portions of a forward and reverse winder used for a seventh form of embodiment of the invention.

The form of embodiment of FIG. 8 may be modified as shown in FIG. 9. In this form, the male screw thread 43 may be formed on the outer periphery of one end of the winding drum 37 while the female screw thread 39 may be formed on the inner circumferential face of the cylindrical stationary feeding screw body 41. The other technical matters of the form of embodiment of FIG. 9 are substantially identical or similar to those of the form of embodiment of FIG. 8. Therefore, the explanation of them will be omitted by reference to them.

The feeder illustrated in FIG. 9 has its function and effect substantially similar to those of the feeder of FIG. 8 whereby the reciprocating body 71 reciprocatively moves in the same manner as that of the aforementioned forms of embodiment.

There are the following forms of embodiment other than the aforementioned forms of embodiment.

The reciprocating body 71 may travel over the guide means 82 in a non-contact manner. In this case, the non-contact guide means 82 may be of magnetic levitation type or air slide type. In the magnetic levitation type, one of the reciprocating body 71 and the guide means 81 may be of magnetic body and the other may be of a magnet or one including the magnet. Otherwise, both of them may be of magnet. One using the magnetic body and the magnet is of suction type, in which the reciprocating body is floated over the guide means 82 while the magnetic power is controlled so that an air gap between them is maintained at a constant value. One using the magnets for both of the reciprocating body 71 and the guide means 82 is of repulsion type, in which there may be provided in the guide means 82 a guide and so on for stabilizing the floating direction. In the air slide type, an air membrane is placed between the interfaces of the reciprocating body 71 and the guide means 82 as well-known. Therefore, air injection means is provided in the reciprocating body 71 and/or the guide means 82 whereby an air is supplied to the interface of the reciprocating body 71 and the guide means 82 through the air injection means. In addition thereto, in the form of embodiment in which the reciprocating body 71 travels on the roll type or slide type guide means 82, low dust generation grease may be filled and held between the reciprocating body 71 and the guide means 82.

Publicly known or well-known scale feedback means may be equipped for controlling the amount of the feeding of the reciprocating body 71 (the amount of movements) in a highly precise manner. The scale feedback means comprises a scale, a detection head and a controller. In more details, the scale may be attached to the base 81 by a fixture disposed along the guide means 82. The detection head for reading the scale may be attached to the reciprocating body 71 through an attachment member. The control means for controlling the motor may be connected to the detection head to receive a detection signal from the detection head and also to the motor 21 to feed a control signal to the motor 21. For one example, in the case where the scale feedback means includes a magnetic type linear scale as its subject part, the scale may comprise a magnetic type ribbon scale, the detection head comprises a magnetic sensor head and the control means comprises a combination of a detector, a positioning counter and an inverter. For another example, in the case where the scale feedback means includes an optical scale as a subject part, the scale (the main scale) comprises a long optical glass board on which a metal memory is vapor-deposited in the fixed pitch, the detection head comprises what is equipped with an index scale, a light emitting element which can take out a two phase signal (a light signal and a dark signal, for example) having the phase difference of 90 degrees and a light receiving element and the control means comprises the same as aforementioned. A frame form of the detection head in the latter scale feedback means may be cylindrical or U-shaped and the detection head may be equipped with those elements so that the light emitting element is on the upper side, the index scale is in the middle and the light receiving element is on the lower side. The scale (the main scale) is disposed between the light emitting element and the light receiving element.

The aforementioned scale feedback means directly measures the amount of feeding of the reciprocating body 71 (the amount of movement) and feeds it back to the motor 21. That is, the detection head on the side of the reciprocating body 71 reads the scale to detect the amount of feeding of the reciprocating body 71 and inputs the detection signal to the controller and the predetermined control signal obtained by calculation with the control means is input to the motor 21 to control the motor 21. This makes the amount of feeding of the reciprocating body 71 very highly accurate. In the case where the scale feedback means includes the magnetic type ribbon scale as the subject part, the magnetic sensor head (the detection head) reads the magnetic lattice pattern (scale) of the magnetic type ribbon scale (scale) to electrically measure the amount of displacement of the position of the reciprocating body 71 and after the detection signal is processed by the detector or a positioning counter, it is input via an inverter to the motor 21. On the other hand, in the case of the scale feedback means having the optical scale as the subject part, the light receiving element on the lower side of the detection head detects the strength (lightness and darkness) of the light (infrared rays) emitted from the light emitting element on the upper side of the detection head and radiated through the index scale to the main scale (scale). The thus detected signal based on the lightness and the darkness is counted by the counter of the control means to measure the amount of displacement and thereafter the control signal which is determined on the result of measurement is input to the motor 21.

There may be equipped a publicly known or well-known disconnection detector corresponding to the linear bodies 51 and 61 for detecting the disconnection of them to thereby immediately stop the operation of the apparatus. As wellknow, such a disconnection detector detects the disconnection of the linear bodies based on the fact that the tension of them gets almost zero when they are disconnected by unexpected accidents and immediately stops the operation of the apparatus by turning off the motor 21 or turning on the a brake of the reciprocating body 71. This can ensure the safety on operation and can restrain damage to the minimum. In addition thereto, the base 81 may be equipped with an auxiliary endless belt (not shown) for prevention of the reciprocating body 71 from moving recklessly when the linear bodies are disconnected. One of two auxiliary belt pulleys is attached in a coaxial manner to the idling belt pulley 84 while the other is disposed on the side of the pulleys 83 and 85 with a proper axial distance from them. The reciprocating body 71 is connected to the intermediate part of such an auxiliary endless belt.

POSSIBILITY OF UTILIZATION IN INDUSTRIES

The feeder according to the invention can not only solve various problems by the conventional belt conveyor, the screw feeding apparatus, the cylinder feeding apparatus, the timing belt feeding apparatus, the robot and so on, but also can show practical effectiveness by compacting the construction of the apparatus. Therefore, the feeder according to the invention can fully show the effect of compactness of the apparatus as a replacement of the conventional ones and can be applied to various kinds of uses.

The invention claimed is:

1. A feeder comprising a forward and reverse winder which can rotate forwardly and reversely, forwardly and reversely winding linear bodies to be wound and rewound through the forward and reverse winder, and a reciprocating body to forwardly and reversely move by means of guide means when it is subject to a forward force or a reverse force; said forward and reverse winder comprising a support shaft driven by a motor and having an exterior part on a periphery of said support shaft, a movable cylindrical body fitted onto the periphery of said support shaft integrally with said support shaft, a cylindrical winding drum having a female screw thread on an inner circumferential face thereof, a stationary cylindrical feeding screw body having on its outer periphery a male screw thread to be engaged with the female screw thread of the winding drum wherein said winding drum is threadedly engaged onto said stationary cylindrical screw body; said cylindrical winding drum is coaxially connected to an outer periphery of said movable cylindrical body through a space, said forwardly and reversely winding bodies being arranged to be wound and rewound by said winding drum of the forward and reverse winder; the amount of winding the forwardly winding linear body by the winding drum of the forward and reverse winder and the amount of rewinding the reversely winding linear body by the winding drum of the forward and reverse winder are equal to each other and also the amount of rewinding the forwardly winding linear body by the winding drum of the winding drum of the forward and reverse winder and the amount of winding the reversely winding linear body by the winding drum of the winding drum of the forward and reverse winder are equal to each other; and the winding drum of the forward and reverse winder on its winding rotation moving in an axial direction through engagement of said stationary cylindrical screw and said female thread in accordance with a winding pitch and a rewinding pitch, wherein during the axial movement of the winding drum, said stationary cylindrical feeding screw body is arranged between the winding drum and the movable cylindrical body.

2. A feeder as set forth in claim 1, further including a dust cover having the forwardly and/or reversely winding linear bodies extending through the dust cover in a non-contact relation thereto.

3. A feeder as set forth in claim 1, wherein said support shaft is a spline shaft and said exterior part includes external spline teeth, said movable cylindrical body includes a body inner circumferential face having internal spline teeth corresponding with and engaged with said external spline teeth, said movable cylindrical body being fixed to said winding drum, whereby said movable cylindrical body and said winding drum rotate together upon rotation of said support shaft by said motor.

4. A feeder as set forth in claim 3, wherein said movable cylindrical body is positioned within said winding drum.

5. A feeder comprising a forward and reverse winder which can rotate forwardly and reversely, forwardly and reversely winding linear bodies to be wound and rewound through the forward and reverse winder, and a reciprocating body to forwardly and reversely move by means of guide means when it is subject to a forward force or a reverse force; the forward and reverse winder comprising a support shaft driven by a motor and having an exterior part on an outer periphery of the support shaft, a movable cylindrical body fitted onto the periphery of the support shaft integrally with the support shaft and a male screw thread on the periphery thereof, a cylindrical winding drum connected to an outer periphery of the movable cylindrical body, a stationary cylindrical feeding screw body having on its outer periphery a screw thread to be engaged with the male screw thread of the movable cylindrical body to thereby threadedly engage the stationary cylindrical screw body onto the movable cylindrical body; said cylindrical winding body being coaxially connected to the movable cylindrical body through a space, the forwardly and reversely winding bodies being arranged to be wound or rewound by the winding drum of the forward and reverse winder connected to the reciprocating body; the amount of winding the forwardly winding linear body by the winding drum of the forward and reverse winder and the amount of rewinding the reversely winding linear body by the winding drum of the forward and reverse winder are equal to each other and also the amount of rewinding the forwardly winding linear body by the winding drum of the forward and reverse winder and the amount of winding the reversely winding linear body by the winding drum of the forward and reverse winder are equal to each other; and the winding drum of the forward and reverse winder on its winding rotation moving in an axial direction through engagement of said screw thread of said stationary cylindrical feeding screw body and said male screw thread in accordance with a winding pitch and a rewinding pitch, wherein during the axial movement of the winding drum, said stationary cylindrical feeding screw body is arranged between the winding drum and the movable cylindrical body.

6. A feeder as set forth in claim 5, further including a dust cover having the forwardly and/or reversely winding linear bodies extending through the dust cover in a non-contact relation thereto.

7. A feeder as set forth in claim 5, wherein said support shaft is a spline shaft and said exterior part includes external spline teeth, said movable cylindrical body includes a body inner circumferential face having internal spline teeth corresponding with and engaged with said external spline teeth, said movable cylindrical body being fixed to said winding drum, whereby said movable cylindrical body and said winding drum rotate together upon rotation of said support shaft by said motor.

8. A feeder as set forth in claim 7, wherein said movable cylindrical body is positioned within said winding drum.

* * * * *